No. 799,369. PATENTED SEPT. 12, 1905.
H. ARNESON.
CHAIN BELT.
APPLICATION FILED MAY 2, 1905.

WITNESSES:
D. E. Carlsen.
J. E. Carlsen.

INVENTOR:
Henry Arneson.
BY his ATTORNEY:
A. M. Carlsen.

UNITED STATES PATENT OFFICE.

HENRY ARNESON, OF RUTHTON, MINNESOTA.

CHAIN BELT.

No. 799,369.  Specification of Letters Patent.  Patented Sept. 12, 1905.

Application filed May 2, 1905. Serial No. 258,512.

*To all whom it may concern:*

Be it known that I, HENRY ARNESON, a citizen of the United States, residing at Ruthton, in the county of Pipestone and State of Minnesota, have invented certain new and useful Improvements in Chain Belts; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in chain belts; and the object is to provide a chain belt the links of which cannot come accidentally apart when getting worn and which are unusually strong for being made on the principle that the links hook into each other and are not slipped together edgewise. This object I attain by the novel construction and arrangement illustrated in the accompanying drawings, in which—

Figure 1:
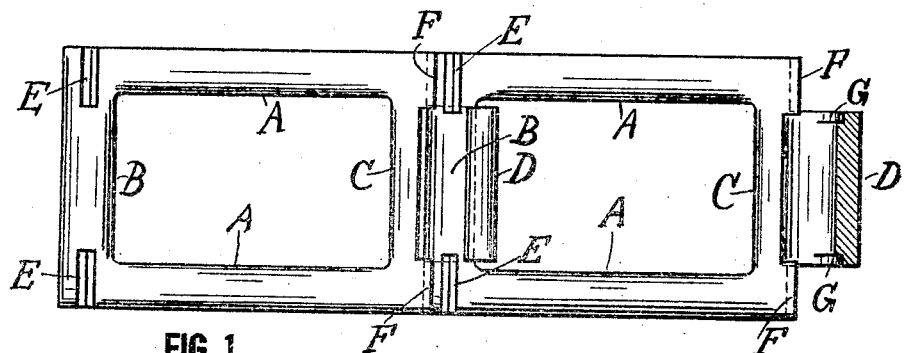
Figure 2:
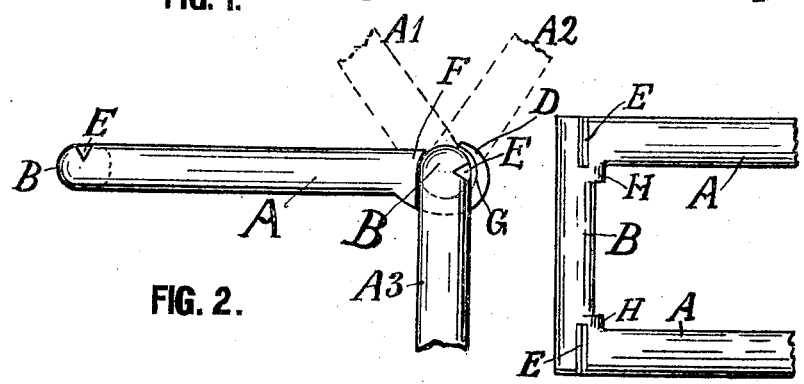
Figure 3:
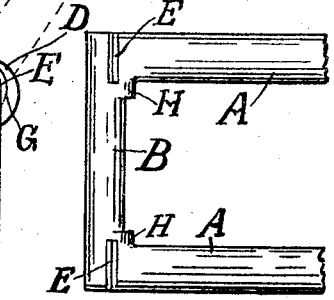

Figure 1 is a plan view of two links of my chain belt joined together. Fig. 2 is an edge view of one link and a portion of another, the latter being represented in two positions by dotted lines. Fig. 3 is a portion of a link of the chain, showing the effect of wear upon it.

Referring to the drawings by letters of reference, the links are all alike and are preferably of a rectangular form, composed of side bars A, which may be approximately cylindrical, and are connected by a cylindrical cross-bar B and a hook-bar C, having a hook D serving as a journal for the bar B of the next link.

In the rear corners of the link, where the link is strongest to stand it, are provided two notches E, which receive the guards F of the front corners of the next link while the latter is folded from the position A' to the position $A^2$ in Fig. 2, thus rolling the bar B into the hook D, in which it may turn till the link occupies the position $A^3$, or as far as it will ever be swung in ordinary use. The bar B is thus held in place by the hook D and the guards F until it is desired to detach the links, when the bar B is rolled out by swinging the link, as from $A^2$ to A'. When, however, the bar B has become old and worn, as shown on the inner side in Fig. 3, it is apt to become disengaged from the hook when the chain is slack and the link approaches upward to the position $A^2$. To prevent such annoying accidental separation of the links, I provide in both sides of the hook D recesses G, which relieve the bar B from wear near the ends, so that it will always have remaining round portions H H to prevent its exit from the hook until the link is brought into the position A' or still further folded toward the next link, which is only done with intention to get them apart.

From the above description it will be understood that I provide a chain belt of links whose bar B is not weakened by any grooves or notches in its main body, where the most strength is required, but has the necessary notches E in the ends forming the corners of the link, which can well stand it, as they are of greater cross-section than any of the bars of the link. It will also be seen that by means of the recesses G a great advantage is gained in the construction and durability of such chains.

Having thus described the invention, what I claim, and desire to secure by Letters Patent, is—

1. A chain-belt link having the recesses G in the sides of its coupling-hook to prevent the entire bar working in the hook from wearing out of cylindrical shape and thus permitting separation of the links.

2. A chain-belt link comprising the side bars A having the guards F at one end of the link, the round end bar or cross-bar B with the end notches E, the cross-bar C with the hook D having the recesses G, substantially as shown and described.

In testimony whereof I affix my signature in presence of two witnesses.

HENRY ARNESON.

Witnesses:
O. D. CHRISTENSEN,
S. B. DUEA.